(No Model.)

D. B. HANSON.
SAW SWAGE.

No. 330,396. Patented Nov. 17, 1885.

WITNESSES.
Chas. N. Leonard,
H. W. Mallett

INVENTOR.
Dempsey B. Hanson,
PER C. Bradford,
ATTORNEY.

UNITED STATES PATENT OFFICE.

DEMPSY B. HANSON, OF INDIANAPOLIS, INDIANA.

SAW-SWAGE.

SPECIFICATION forming part of Letters Patent No. 330,396, dated November 17, 1885.

Application filed September 11, 1884. Serial No. 142,767. (No model.)

*To all whom it may concern:*

Be it known that I, DEMPSY B. HANSON, of the city of Indianapolis, county of Marion, and State of Indiana, have invented certain new and useful Improvements in Saw-Swages, of which the following is a specification.

The object of my said invention is to produce a cheap and effective power-swage, whereby saw-teeth may be swaged from the under side. This object is accomplished by providing a heavy metal base carrying a fixed jaw, against which the upper side of the saw-tooth will rest during the operation of the swage, and a movable jaw operated by a cam-shaft and a lever, said movable jaw being sustained in position by an appropriate bearing upon the frame or base, as will be hereinafter more fully described.

Figure 1:
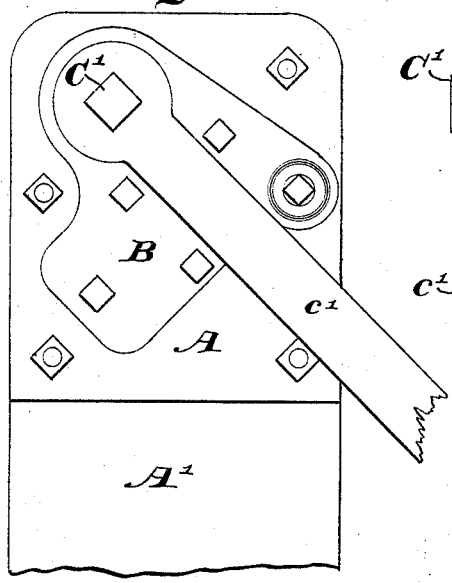
Figure 2:
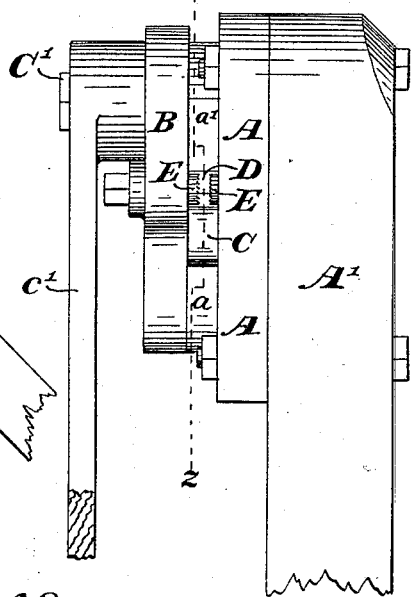
Figure 4:
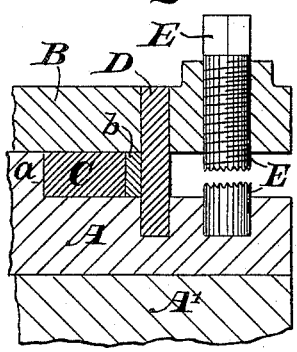
Figure 3:
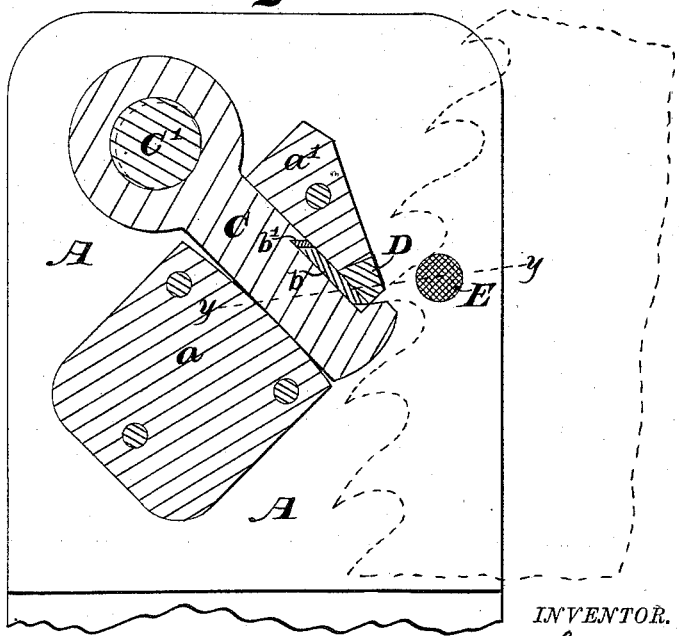

Referring to the accompanying drawings, which are made a part hereof, and on which similar letters of reference indicate similar parts, Figure 1 is a side elevation of a saw-swage embodying my invention in position as when operating upon a saw; Fig. 2, a front elevation of the same; Fig. 3, a vertical sectional view, on an enlarged scale, looking to the right from the dotted line $z\ z$ in Fig. 2; and Fig. 4, a detail sectional view, looking upwardly from the dotted line $y\ y$.

In said drawings, the portions marked A represent the base of my improved saw-swage; B, the cap-plate; C, the movable die of the swage; D, the anvil and E the clamp, whereby the saw is held in position while being operated upon.

The base A is a heavy iron casting, and is adapted to be bolted to the post A'. Upon the swage are formed projecting portions $a\ a'$, between which the movable die of the swage operates. One of these, $a$, serves as a backing for said movable die, against which it bears during its operation, and the other, $a'$, as a backing for the anvil D. These portions also serve as bearings for the cap-plate, and said cap-plate rests against them, as shown in Fig. 2. The space between the base A, these two portions, and the cap-plate B forms a way in which the movable die of the swage operates.

The cap-plate B is simply a metallic plate bolted securely to the base A, as shown, and serves to hold the movable die C in position, and also carries one jaw of the saw clamp E, as will be presently described.

The movable die C is mounted in a way formed between the parts $a$ and $a'$, as before described, and is operated by the cam-shaft C' and the lever $c'$ thereof. At the point $c$ (see Fig. 3) this die is formed at such an angle as to come directly against the under side of the saw-tooth when the saw is placed in position to be operated upon, and swage or spread out the point of the tooth, as will be readily understood. Just above this point this movable die is cut away, as shown in Fig. 3, and a piece, $b$, inserted therein, which runs alongside the anvil D, against which the point of the saw-tooth comes in contact when placed in position to be operated upon by the swage. This die being cut away in this manner permits the face of the portion which comes against the saw-tooth, when worn by use, to be ground or otherwise put in condition for further use, and the piece $b$ is adapted to follow up this face as it is ground away, and can be held in position by a smaller piece, $b'$, being inserted behind it at the upper end, the size of this piece being increased as the face is worn away, as described.

The anvil D is simply a bar of steel placed under and resting against the projecting portion $a'$, with its ends tenoned into the base A and the cap-plate B, and thus held securely in position.

The die C and anvil D are of course of steel, and highly tempered, while the base and cap-plate may be of cast-iron.

The saw-clamp E consists of a piece of steel with a serrated or roughened face set in the base and projecting slightly above its surface, and a corresponding piece of steel coming down from the cap-plate B, the latter being screw-threaded and adapted to be moved toward or from the portion in the base A, by means of a wrench or otherwise.

Having thus fully described my said invention, what I claim as new, and desire to secure by Letters Patent, is—

1. The combination, in a saw-swage, of the base A, having projecting portions $a\ a'$, the cap-plate B, the movable die C, running between said projecting portions, a cam-shaft, C', and its lever for operating said movable die, an anvil, D, and a clamp for securing the saw in position while being operated upon, substantially as set forth.

2. The combination, in a saw-swage, of a base provided with bearings $a$ and $a'$, an anvil, D, mounted alongside and against one of said bearings, a movable die, C, reciprocating between said bearings, and a clamp, E, consisting of two portions having serrated faces adjacent to each other, one of said portions being fixed and the other being movable toward and from said fixed portion, and thus adapted to hold the saw in position while being operated upon by the swage, substantially as set forth.

3. The combination, in a saw-swage, of the base, projections or bearings thereon for the movable die, an anvil, means for operating said movable die, and a saw-clamp, said movable die being cut away at one side in front of the face which comes against the saw-tooth, and a movable piece, $b$, inserted in place of said cut-away portion, substantially as described, and for the purposes specified.

4. The combination of the base A, projecting portions or bearings $a$ $a'$, cap-plate B, movable die C, cam-shaft and lever for operating the same, the anvil D, and the clamp E, said several portions being arranged and operating substantially as set forth.

5. In a saw-swage, in combination with the base, anvil, cap-plate, and operating mechanism, the movable die C, having a face adapted to operate upon the saw-tooth, and a cut-away portion just above said face, and provided with a piece, $b$, which fills said cut-away portion, and is adapted to be removed therefrom when it is desired to put said face in order, substantially as shown and specified.

6. The combination, with the stock or frame of a saw-swaging device, of a saw-swaging tool movable in a right line, a fixed anvil against which the tooth is swaged, a lever for reciprocating said swaging-tool, and a screw-clamp for holding the saw in position during the operation of swaging a tooth.

In witness whereof I have hereunto set my hand and seal, at Indianapolis, Indiana, this 6th day of September, A. D. 1884.

DEMPSY B. HANSON.

In presence of—
C. BRADFORD,
CHAS. L. THURBER.